Sept. 24, 1929.    R. KONDO    1,729,273
FLEXIBLE GLASS
Filed Aug. 28, 1928
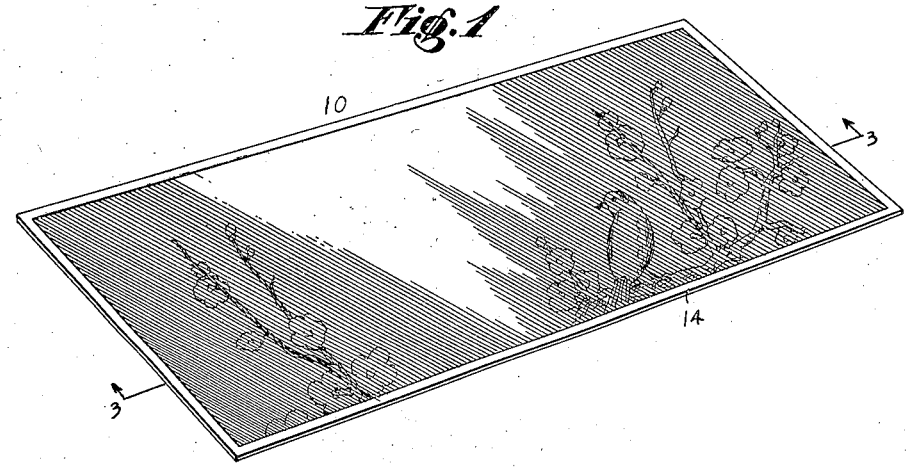
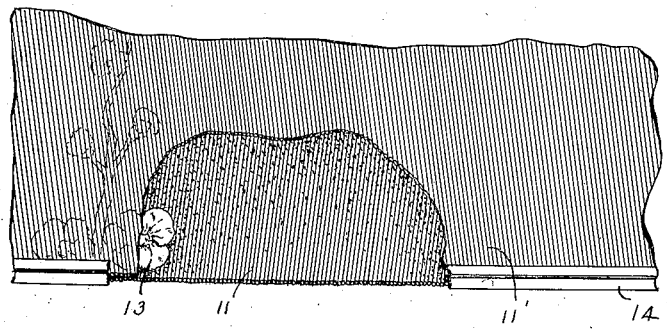
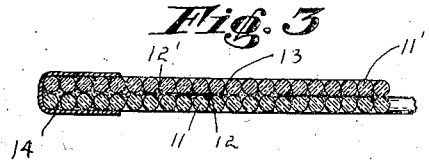
INVENTOR.
Roku Kondo
BY Max D. Ordmann
ATTORNEYS.

Patented Sept. 24, 1929

1,729,273

UNITED STATES PATENT OFFICE

ROKU KONDO, OF LYNDHURST, NEW JERSEY, ASSIGNOR TO TAIYO TRADING CO., INC., A CORPORATION OF NEW YORK

FLEXIBLE GLASS

Application filed August 28, 1928. Serial No. 302,631.

The present invention relates to flexible glass designed to be used in the manufacture of articles such as flexible glass sheet, lamp shades, drop curtains, portable screens, automobile curtains and the like.

A further object is to provide a novel flexible glass which may be easily manufactured at relatively low cost.

Another object is to provide a flexible glass which may readily have incorporated therein designs of various kinds suitable to the particular uses for which the glass is employed.

A further object is to provide translucent flexible glass.

Still another object is to provide a novel, simple and comparatively low cost method of making my flexible glass.

With these and other objects in view my invention consists in the article of manufacture in form of flexible glass and the novel method of making the same.

My invention will be more clearly understood with reference to the accompanying drawing in which similar reference characters denote corresponding parts, and in which Fig. 1 is a perspective view of one form of my finished article; Fig. 2 a detailed view of a portion of my article with a cut away section to show the construction thereof and Fig. 3 is a fragmental sectional view along line 3—3 of Fig. 1.

10 denotes a completed sample of my flexible glass and is comprised of a layer of obliquely laid glass rods or threads 11 of suitable cross sectional shape and size, a layer of suitable transparent or translucent binding material 12, a suitable design or pattern 13 on top of said layer of binding material 12, a second layer of binding material 12' and a second layer of obliquely laid glass rods or threads 11' laid in angular relation to the glass rods 11. The edges of the article formed may be protected by a suitable protecting means such as a frame 14 of wood, metal or any other suitable material.

The method of making my article consists in first placing a plurality of the glass rods or threads 10 side by side obliquely on a flat surface. Then with these rods 10 held in position a layer of any suitable elastic, translucent or transparent binding material such as collodion, shellac or the like, is spread thereover. Next, a design such as 13 which it is desired to incorporate with the flexible sheet and which may consist of any desired colored cut out designs of paper, cloth, or any other suitable material is laid on top of the layer of binding material in desired position. Then a second layer of the same binding material as before is spread over the design, and the first layer of said binding material, and then a second layer of glass rods is laid in oblique direction but opposite to the obliquity of the first named rods 10 in the manner indicated in Fig. 2 of the drawing, and is held in place by the second layer of binding material. The whole built up sheet is now held fixed and the binding material allowed to set after which a rigid or flexible frame such as 14 may be made around the edges of the sheet to protect them. The angle the individual rods or threads of the two layers make relative to each other determines comparative flexibility of the resulting sheet. If desired the design may be omitted.

I found that one combination which gives a satisfactory flexible glass, comprises layers of glass rods of approximately one-thirty-second of an inch in diameter, the rods of each layer making angles of approximately seven and one half degrees with the normal, the angular measure for each of the respective layers being in the opposite direction from the normal. The diameter of the rods and the angles of obliquity are of course not limited to the dimensions enumerated above.

The resulting glass sheet is flexible and may be freely bent in any direction except against the axis of the glass rods. However, if said rods are of small enough diameter, bending of the sheet may even be obtained in this direction.

By suitably regulating the length of the various glass rods various shaped sheets may of course be obtained.

Instead of using glass rods, in case it is desired to make flexible sheets of other substances, I may use rods made of quartz, mica, hard rubber, wood or any other suitable material and by using the method of my invention, secure a flexible sheet of the material used.

My article and method may be obviously readily modified in various ways without departing from the spirit of my invention and I do not wish to be limited to the article and method shown and described.

What I claim is:

1. A method of making flexible glass consisting in laying an oblique layer of glass rods side by side, covering the same with a layer of binding material, placing a design on said bindng material, covering over said design with a second layer of binding material and laying a second oblique layer of glass rods side by side over said second layer of binding material.

2. As an article of manufacture, flexible glass comprising a layer of glass elements, a layer of binding material, a design, a second layer of binding material and a second layer of glass elements on top of said second layer of binding material, said layers of binding material securely holding the whole structure together.

3. A method of making a flexible sheet consisting in laying an oblique layer of rod like elements, covering the same with binding material and laying a second oblique layer of rod like elements, thereover and crosswise to the elements of said first layer of elements.

4. A method of making translucent flexible sheet consisting in laying an oblique layer of light transmitting rods, covering the same with a layer of binding material, and laying a second oblique layer of light transmitting rods thereover and cross-wise to the first layer of said rods.

In testimony whereof I affix my signature.

ROKU KONDO.